United States Patent Office 2,829,738
Patented Apr. 8, 1958

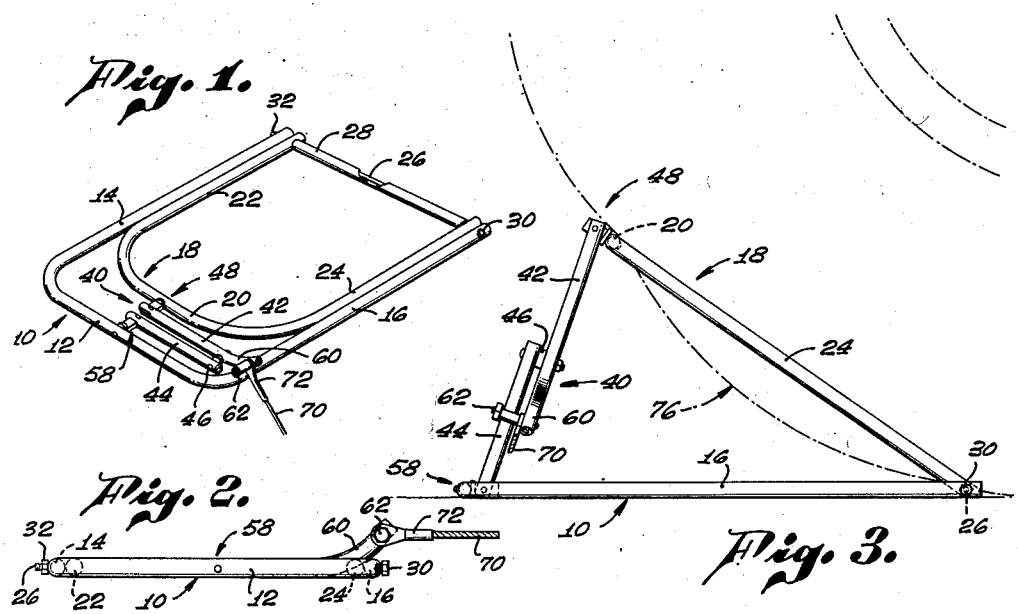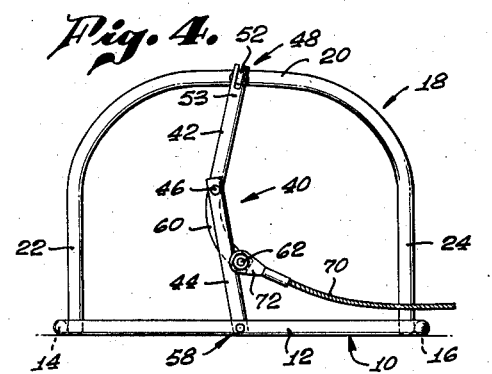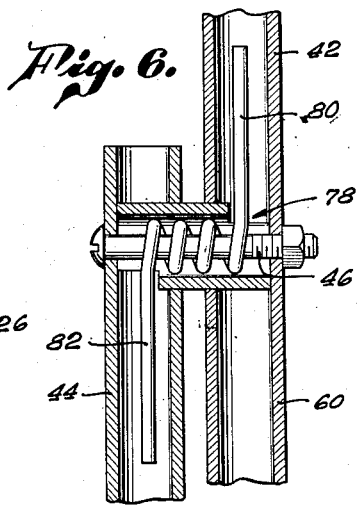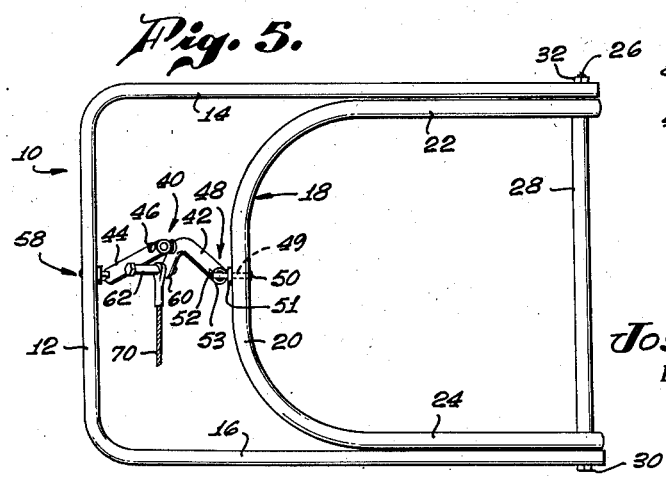

2,829,738

COLLAPSIBLE CHOCK

Joseph C. Vasquez, Venice, Calif.

Application August 25, 1954, Serial No. 452,154

3 Claims. (Cl. 188—32)

This invention relates generally to a collapsible wheel chock particularly adapted for use in connection with aircraft.

During warming up of the engine of an airplane and in other ground operations it is normally necessary to block the wheels of the aircraft against movement. The devices used for such blocking should be easily removable when desired in order to free the aircraft for movement. Moreover, the devices should be adapted for one-man operation; that is, such devices should be recoverable by the pilot of an airplane from his pilot seat so that for example emergency repairs may be made at a place distant from an established airport. In such a situation, when the aircraft is ready to fly, the pilot alone, without outside assistance, should be able to remove the chocks from in front of the wheels, and retrieve them for possible future use.

Although the collapsible chock of the present invention is particularly adapted for use in connection with airplanes as above indicated, nevertheless it will be understood that the device may be used to block movement of any rolling object for example automobiles or the like.

In the preferred embodiment of the invention herein shown and described the major portion of the structure is fabricated of hollow tubular members made of suitable metal such as steel or aluminum. By this means the device affords the greatest strength and rigidity for its weight. A pair of collapsible chocks made in accordance with the present invention weighs less than four pounds and may therefore be easily transported in an airplane without undue increase of airborne weight. The structure is maintained in extended or operative position by suitable collapsible support means preferably an over-center or toggle mechanism. Release of such mechanism to permit collapsing is accomplished by urging the toggle mechanism past its dead-center position whereupon the forward force of the aircraft tire or wheel causes complete collapse of the device and permits forward movement of the wheel. As will be evident, the chocks of the present invention are preferably used in pairs so that one chock blocks one wheel of an aircraft or similar vehicle, and desirably both chocks may be collapsed at the same moment when desired.

An important advantage of the chock of the present invention is that, when collapsed, all parts of the chock in the path of a rolling airplane wheel lie flat upon the ground and present a very low vertical dimension as the wheel rolls thereover. By this construction, the device is subjected to a negligible minimum of strain during use and it thus has an exceptionally long life.

An object of the present invention is therefore to provide a novel collapsible chock employing a toggle mechanism for collapsing the chock.

Another object of this invention is to disclose a device of the above character whose structural components are extremely light in weight.

A further object is to disclose a collapsible chock having a flexible cable by which to actuate the collapsing mechanism whereby the operator of an aircraft can, by pulling in the cable, retrieve a collapsed chock after the aircraft has moved past the chock.

Another object of the invention is to provide a collapsible chock wherein, after being collapsed, all parts of the chock in the path of a rolling wheel theretofore blocked by the chock lie flat upon the ground.

A further object is to provide a wheel-blocking chock including collapsible support means resiliently biased toward extended or supporting position.

These and other and allied objects and purposes of the invention will be understood from a study of the following description of a preferred embodiment thereof taken in connection with the accompanying drawing in which:

Fig. 1 is a perspective view of a collapsible wheel chock embodying the present invention, the chock being shown in collapsed position, and a portion of the rear tubular sleeve member being broken away to disclose the transverse rod therein.

Fig. 2 is a front elevational view of the chock as shown in Fig. 1.

Fig. 3 is a side elevational view of the chock in operative position, together with a fragmentary portion of a wheel blocked thereby.

Fig. 4 is a front elevational view of the chock as shown in Fig. 3.

Fig. 5 is a top plan view of the chock as shown in Figs. 3 and 4.

Fig. 6 is a fragmentary sectional view taken on line VI—VI of Fig. 4, showing one form of resilient means for use in conjunction with the collapsible support means.

Referring now in detail to the drawings and first to Figs. 1 and 2 thereof, there is shown a chock of the present invention in its collapsed or inoperative position. The chock includes a flat, horizontally disposed base or ground-engaging member indicated generally at 10 preferably U-shaped in form, having a transverse central yoke 12 and a pair of parallel legs 14 and 16 extending longitudinally of the chock and rearwardly from the yoke 12. Within the ground-engaging member 10 is a wheel-engaging member indicated generally at 18 and also desirably U-shaped in form, including a central transverse yoke portion 20 and a pair of parallel legs 22 and 24 extending rearwardly from the yoke 20. The base member 10 and the wheel-engaging member 18 are desirably both made of hollow tubular metal preferably aluminum or one of its compounds for lightness and strength. The two members are pivotally attached at the rear ends of their legs by a transverse horizontal rod or through-bolt 26 within a tubular sleeve 28. The rod 26 is provided with an enlarged head 30 at one end, and a suitable nut 32 threadedly engages the other end of the rod to retain the parts in assembled relation as shown.

With reference now to Fig. 3, the chock is there shown in operative or wheel-retaining position and it will be seen that the wheel-engaging member 18 is pivoted upwardly about the rod 26 as an axis, the wheel-engaging member being held in this extended position relative to the base member 10 by collapsible support means indicated generally at 40. As best seen in Fig. 4, the support means 40 include an upper link 42, a lower link 44 and a pivotal connection 46 between the two links. The upper end of link 42 is swivelly attached at its upper end to the central yoke 20 of the wheel-engaging member 18 by suitable means indicated generally at 48. In the present illustration, the swivel means 48 include a pivot pin 49 extending through and rotatably journaled in apertures formed in the yoke 20, the pin 49 having an upset portion 50 (see Fig. 5) and an integrally formed flange 51 on opposite sides of yoke 20. The pin 49 includes also an axially extending tongue 52 to which the upper end of link 42 is pivotally connected as by a pin extending through the tongue 52 and through openings formed in the bifurcated upper end 53 of the link 42. The lower end of link 44 is swivelly connected to the yoke 12 of the ground member 10 by suitable means indicated generally at 58 which are desirably similar in detail to the swivel means 48 heretofore described. The swivel connections 48 and 58 lie in a common vertical plane longitudinal of the chock and perpendicular to the axis 26 so that when the chock is collapsed into its position as shown in Fig. 1, the swivelled ends of the links 42 and 44 are colinearly disposed. Desirably the swivel joints 48 and 58 are disposed centrally of their respective transverse yokes 20 and 12, but this is not necessary.

Means are provided for limiting relative rotation of the links 42 and 44 about their pivot 46 and thereby holding the parts in extended or operative position as shown in Figs. 3, 4 and 5. In the present illustrative embodiment of the invention, such means are afforded by an arcuate extension 60 of the upper link 42 provided with a pin 62 carried by the extension 60, the pin being generally parallel to the axis of pivot 46 and projecting perpendicularly to the plane defined by the extension and into the plane of movement of link 44. The pin 62 is adapted to abut against the side of lower link 44 when the device is in extended position. The configuration of the arcuate extension or offset portion 60 of link 42 and its abutment member or pin 62 is such that the abutting contact best seen in Fig. 4 occurs only after the pivotal connection 46 between the two links 42 and 44 has moved upwardly from the collapsed position seen in Figs. 1 and 2 beyond the longitudinal vertical plane through the swivel connections 48 and 58. Thus the pivoted links 42 and 44 constitute a toggle or over-center device for supporting the wheel-engaging member 18 in its upper position seen in Figs. 3, 4 and 5.

Means are provided for collapsing the device by moving the pin 62 rightwardly as seen in Fig. 4 away from abutting relation with link 44, such means being here shown as including a flexible cable 70 attached by suitable means 72 to the pin 62. It will be seen that tensile force exerted upon the cable 70 will cause the pivotal axis 46 to move rightwardly as seen in Fig. 4. As soon as the axis passes from left to right through the longitudinal vertical plane through the swivel connections 48 and 58, the forward force of the wheel 76 exerted against the wheel-engaging member 18 causes the member 18 to collapse to its position seen in Figs. 1 and 2.

It is especially to be noted, with particular reference to Fig. 2, that all parts of the present chock within the path of the forward rolling wheel 76 lie flat upon the ground and extend upwardly therefrom only by the thickness of the tubular components of the device. Thus the wheel 76 is enabled to smoothly roll over the collapsed chock without in any way damaging the wheel or the chock. As before stated, the swivel joints 48 and 58 need not be centrally disposed laterally of the chock, but they should be so located that the straight portion of the link extends to the side leg 24 whereby the offset portion 60 is outwardly of the side leg.

Means may be provided for insuring that the parts assume the position shown in Fig. 4 when the wheel-engaging member 18 is manually moved upwardly to put the chock into operative position. In the present embodiment such means include a resilient member biasing the link 42 clockwise about the pivot 46 relative to the lower link 44. One form of such resilient member is shown in Fig. 6 and includes a wire spring indicated generally at 78 helically coiled about the pivot pin 46 and having a leg 80 extending upwardly within the tubular link 42 and a second leg 82 projecting downwardly within the tubular link 44. The force exerted by the spring 78 need not be very great, being only sufficient to insure that the parts remain in their position of Fig. 4 in spite of vibration which may be transmitted to the chock by the engine of an airplane or other vehicle whose wheel is being blocked.

Collapse of the device is initiated by a sharp pull or tug on cable 70 in a generally upward and rightward direction as seen in Fig. 4. It will be readily understood that when such a tug is applied to the cable 70, movement of the parts into their collapsed position is not appreciably resisted by the force of spring 78. It will further be understood that in collapsing the chock, the force applied to the pin 62 at the lower end of link 42 requires that the wheel-engaging member 18 be moved upwardly through a very short distance before finally moving downwardly into the collapsed position of Fig. 1. Such slight upward movement of the wheel engaging member 18 is readily permitted by reason of the resiliency of the tire of wheel 76.

It is further to be noted that after the chock has been collapsed into its position of Figs. 1 and 2, and the wheel has moved forwardly beyond the chock, the entire device may be retrieved from the ground by means of the cable 70. Thus a pair of the present devices, one left hand and the other right hand, are especially well adapted for use by an individual pilot who may find it necessary, without assistance from other persons, to start the engine of his airplane with the wheels chocked and then take off.

Although the invention has been principally described herein above in connection with its use in blocking the wheels of an airplane, those skilled in the art will immediately understand that the invention is not limited to such use but may be used in connection with other rolling vehicles or even with large pieces of equipment such as furniture or the like which must be temporarily blocked against movement.

Modifications and changes from the specific preferred forms of the invention herein shown and described will occur to those skilled in the art. All such modifications and changes not departing from the spirit of the invention are intended to be embraced within the scope of the appended claims.

I claim:

1. A collapsible chock for blocking a wheel or the like against movement comprising: a U-shaped base member having a front transverse yoke portion and parallel legs extending longitudinally rearwardly therefrom; a U-shaped wheel-engaging member having a transverse yoke and parallel legs extending longitudinally rearwardly therefrom, the legs of both members being pivoted at their rear ends for swinging about a transverse horizontal axis; a first link having one end swivelly connected to the yoke of the base member; a second link having one end swivelly connected to the yoke of the wheel-engaging member, said links being pivotally connected together at a point spaced from said ends about an axis transverse to said first axis; an arcuate extension on said second link lying in a plane generally perpendicular to the second named axis and provided with an abutment member projecting into the plane of movement of said first link and abuttable thereagainst; and resilient means for biasing said abutment member into abutting contact with said first link.

2. A collapsible chock for blocking a wheel or the like against movement comprising: a U-shaped base member having a front transverse yoke portion and parallel legs extending longitudinally rearwardly therefrom; a U-shaped wheel-engaging member having a transverse yoke and parallel legs extending longitudinally rearwardly therefrom, the legs of both members being pivoted at their rear ends for swinging about a transverse horizontal axis; a first link having one end swivelly connected to the yoke of the base member; a second link having one end swivelly connected to the yoke of the wheel-engaging member, said links being pivotally connected together at a point spaced from said ends about an axis transverse to said first axis; and an extension on one of said links lying in a plane generally perpendicular to the second named axis and provided with an abutment member projecting into the plane of movement of the other of said links and abuttable thereagainst.

3. A collapsible chock comprising: a base member; a wheel-engaging member; means pivotally connecting ends of said members; a first link having one end swivelly connected to a distal portion of the base member; a second link having one end swivelly connected to a distal portion of the wheel-engaging member, said links being pivotally connected together; and an offset extension on one link terminating in an abutment member projecting into the plane of movement of the other link and abuttable thereagainst, said links and abutment member constituting an over-center toggle connection supporting the wheel-engaging member angularly spaced above the base member.

References Cited in the file of this patent

UNITED STATES PATENTS

| | | |
|---|---|---|
| 2,240,512 | Morgensen | May 6, 1941 |
| 2,316,178 | Morgensen | Apr. 13, 1943 |
| 2,618,168 | Onsrud | Nov. 18, 1952 |
| 2,623,759 | Forbas | Dec. 30, 1952 |